United States Patent [19]

Tomita et al.

[11] 4,414,732
[45] Nov. 15, 1983

[54] MACHINE TOOL WITH AUTOMATIC TOOL CHANGE FUNCTION

[75] Inventors: Tamaki Tomita, Okazaki; Yoshikazu Sano, Kariya; Kunimichi Nakashima, Anjo, all of Japan

[73] Assignee: Toyoda Koki Kabushiki Kaisha, Kariya, Japan

[21] Appl. No.: 250,101

[22] Filed: Apr. 2, 1981

[51] Int. Cl.³ .............................................. B23Q 3/157
[52] U.S. Cl. ....................................... 29/568; 414/749
[58] Field of Search ............... 29/568, 26 A; 414/749; 408/35

[56] References Cited

U.S. PATENT DOCUMENTS

| | | |
|---|---|---|
| 3,191,260 | 6/1965 | Jorgensen et al. |
| 3,791,022 | 2/1974 | Kurimoto et al. ............ 29/568 |
| 3,851,562 | 12/1974 | Tomita et al. ............ 29/568 |
| 3,874,071 | 4/1975 | Kato ........................ 29/568 |
| 3,994,061 | 11/1976 | Tomita et al. ............ 29/568 |

*Primary Examiner*—Z. R. Bilinsky
*Attorney, Agent, or Firm*—Oblon, Fisher, Spivak, McClelland & Maier

[57] ABSTRACT

In a machine tool with an automatic tool change function, a rotatable tool spindle carries a key engageable with a key-way formed on a tool. A tool change arm, serving as a tool support device, rotatably supports at least one tool to selectively insert and remove the same into and from said tool spindle. When a tool change operation is to be performed, the rotation of the spindle is changed into a predetermined speed suitable for the key-way engagement. An operating device is provided for causing relative movement between the tool change arm and the spindle to insert a tool into the spindle. However, the relative movement thereof is stopped by a stopping device just before the engagement of the key with the key-way. Subsequently, when a first detecting device detects that the key has reached a predetermined angular position, the relative movement of the tool change arm is permitted to thereby make engagement of the key with the key-way. A second detecting device detects the key-engagement and then the tool is clamped in the spindle for a machining operation. After the machining operation, when a third detecting device detects that the key has reached a predetermined angular position, the operating device is operated to move the tool change arm for removing the tool from the spindle.

13 Claims, 9 Drawing Figures

MACHINE TOOL WITH AUTOMATIC TOOL CHANGE FUNCTION

BACKGROUND OF THE INVENTION

1. Field of the Invention

The present invention relates to a machine tool with an automatic tool change function, which is capable of making engagement between a key of a tool spindle and a key-way of a tool or a tool holder without stopping rotation of the spindle.

2. Description of the Prior Art

Conventionally, in order to make engagement between a key of a tool spindle and a key-way of a tool, the spindle is stopped at a predetermined angular position where the key comes into the corresponding position of the key-way to thereby permit the tool to be inserted thereinto by a tool change arm.

In order to stop the spindle at such a predetermined angular position, two operational steps are required. That is, the spindle is first stopped within a predetermined angular range by controlling a spindle drive motor and then indexed to the predetermined angular position by a mechanical device including, for example, an index plate and an index pin. Accordingly, it takes a longer time for stopping the spindle at the predetermined angular position, resulting in a longer tool change time. Further, the device required for accomplishing the above operation is rather expensive.

In order to solve these disadvantages and perform a tool change operation without stopping rotation of a spindle, it has been considered to urge a flange portion of a tool toward the key of the rotating spindle to achieve the engagement between the key-way of the tool and the key of the spindle after relative frictional rotation therebetween. In this method, however, the contacting surfaces of the key and the flange portion of the tool are necessarily worn due to the sliding contact therebetween and the relatively high pressure applied thereto and there is a fear of decreasing the final accuracy after a machining operation due to the variation of the tool position inserted in the spindle as a result of uncertainty of which one of two key-ways is engaged with the key of the spindle.

Furthermore, even if a tool change operation is performed without stopping rotation of the spindle, there is a problem that a large diameter tool with a radially projected cutter has to be returned from the spindle to the tool magazine with its key-way being maintained at a predetermined angular position in order to prevent interference with an adjacent tool in the tool magazine.

SUMMARY OF THE INVENTION

It is an object of the present invention to provide an improved machine tool with an automatic tool change function wherein a key engagement is performed between a key-way of a standard tool and a key of a spindle without stopping the rotation of the spindle and without making any sliding contact between the key-way and the key.

Another object of the invention is to provide an improved machine tool with an automatic tool change function wherein a key engagement is performed between a key-way of a standard tool and a key of a spindle in response to a signal generated when the key comes into a predetermined angular position relative to the key-way.

Briefly, according to the present invention, these and other objects are achieved by providing a machine tool with an automatic tool change function having a tool spindle rotatably supported and capable of receiving a tool at one end thereof. A key is fixedly mounted on one end of the tool spindle and a key-way is formed on the tool. Tool support means are provided for rotatably supporting at least one tool to selectively insert and remove the same into and from the tool spindle. Control means are responsive to a tool change command for rotating the tool spindle at a predetermined speed suitable for the engagement of the key with the key-way. Operating means are provided for causing relative movement between the tool support means and the tool spindle for a tool change operation with the tool spindle being rotated at the predetermined speed. Stopping means are provided for stopping the relative movement between the tool support means and the tool spindle at a predetermined position before the key comes into engagement with the key-way. A first detecting means is provided for detecting a first predetermined angular position of the key relative to the key-way to thereby generate a first signal, and a releasing means is responsive to the first signal for permitting the relative movement between the tool support means and the spindle. A second detecting means is provided for detecting the engagement of the key with the key-way to generate a second signal, and a clamp means is responsive to the second signal for clamping the tool inserted into the tool spindle.

In another aspect of the present invention, a third detecting means is provided for detecting a predetermined angular position of the key relative to the key-way to thereby generate a third signal, and the operating means is operated in response to the third signal for causing relative movement between the tool support means and the tool spindle to remove the tool from the tool spindle.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which.

DETAILED DESCRIPTION OF A PREFERRED EMBODIMENT

Figure 1:
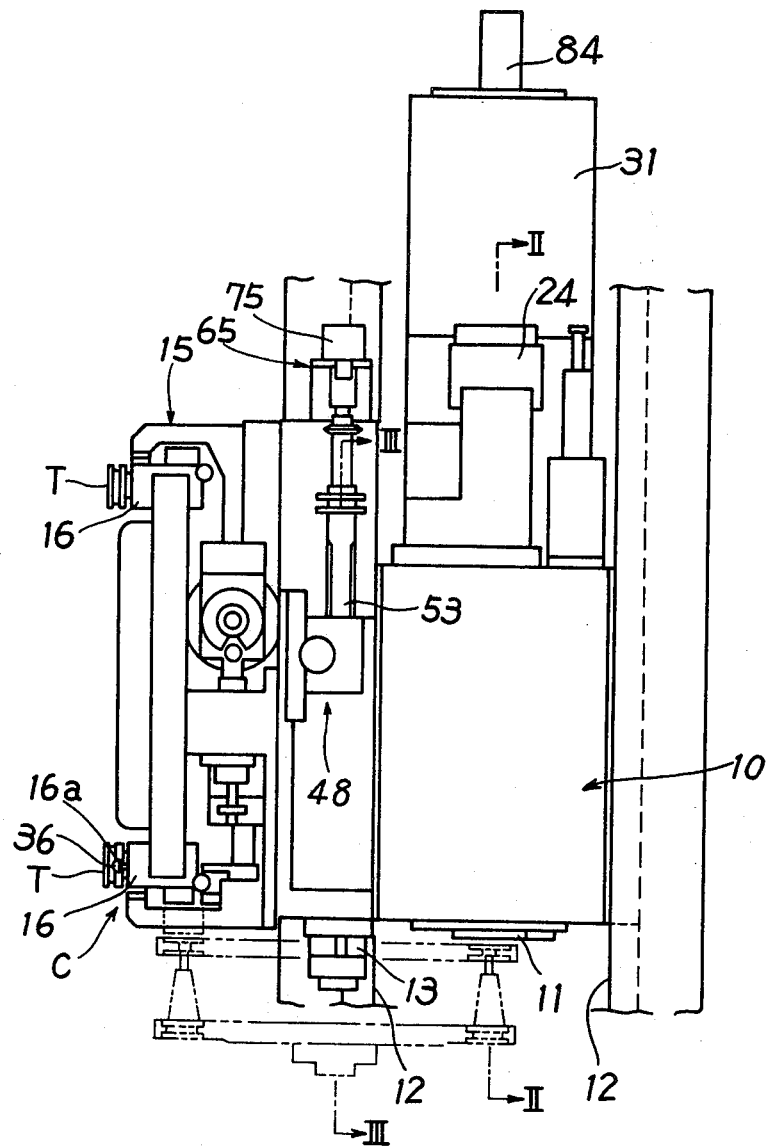
FIG. 1 is a front view showing a spindle head and an automatic tool change apparatus according to the present invention.

Referring now to the drawings, wherein like reference numerals or characters refer to identical or corresponding parts throughout the several views, and more particularly to FIG. 1, there is shown a spindle head 10 which is guided on guide ways 12 and 12 formed on an upstanding column, not shown, for a vertical sliding movement and rotatably supports a vertical spindle 11. FIG. 1 shows an upper end position of the spindle head 10, where a tool change operation is performed. The reference numeral 13 indicates a tool change arm having tool grippers at opposite ends thereof to serve as a tool support device. The tool change arm 13 is movable in a direction parallel to the axis of the spindle 11 and is rotatable about a vertical axis. A tool magazine 15 is rotatably supported and carries a plurality of tool sockets 16 on the periphery thereof. Each tool socket 16 removably supports a tool T and is indexable to a tool change position C, where the indexed tool socket 16 is pivotable from a horizontal position shown in solid lines to a vertical position shown in phantom lines for enabling the tool change arm 13 to change the tools between the vertically oriented tool socket 16 and the spindle 11. Each tool socket 16 on the tool magazine 15 is provided with a detent pin 16a engageable with a key-way 36 formed on each tool T with some play to restrict the direction of movement of the key-way 36 of the tool T received in the tool socket 16 within a predetermined angular extent. Accordingly, a large diameter tool with a radially projected cutter, such as a boring cutter, is prevented from interference with an adjacent tool.

Figure 2:
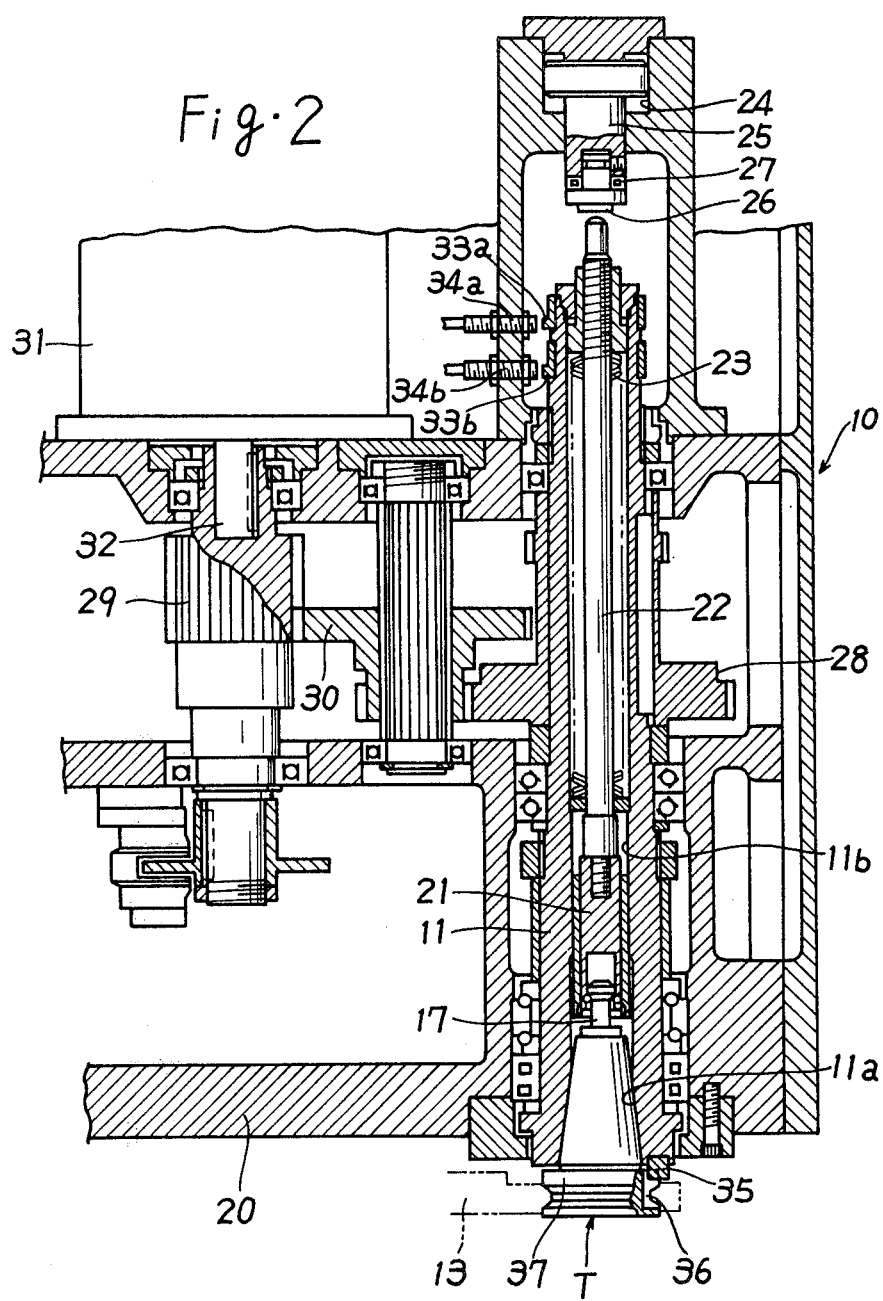
FIG. 2 is an enlarged sectional view taken along the lines II—II in FIG. 1.

Referring to FIG. 2, showing a detailed construction of the spindle head 10, the spindle 11 rotatably supported by a housing 20 is formed with a tool receiving tapered bore 11a at its lower end and a through bore 11b connected to the tapered bore 11a. Within the through bore 11b, there are received a snap member 21 engageable with a pull stud 17 extended from one end of a tool T received in the tapered bore 11a, a drawing rod 22 connected at its forward end with the snap member 21 and projecting at its rear end from the rear end of the spindle 11, and a set of washer springs 23 urging the drawing rod 22 in the rearward direction relative to the spindle 11, in such a manner as to constitute a clamp device for clamping the tool T relative to the spindle 11. In face-to-face relationship with the rear end of the drawing rod 22, there is disposed an unclamping cylinder 24 whose piston rod 25 rotatably supports an abutting member 26 at its forward end through a thrust bearing 27. When the drawing rod 22 is urged against the springs 23 through the abutting member 26, the tool T in the spindle 11 is unclamped. A gear member 28 is secured on the spindle 11 and is connected through a shiftable transmission gear member 30 and a drive gear 29 to an output shaft 32 of a spindle drive motor 31 which is mounted on the upper end of the spindle head 10. The drive motor 31 is driven at a speed depending upon a rotary speed command applied from a numerical control device NC and also at a predetermined low speed in response to a tool change command, as described later in more detail.

Figure 8:
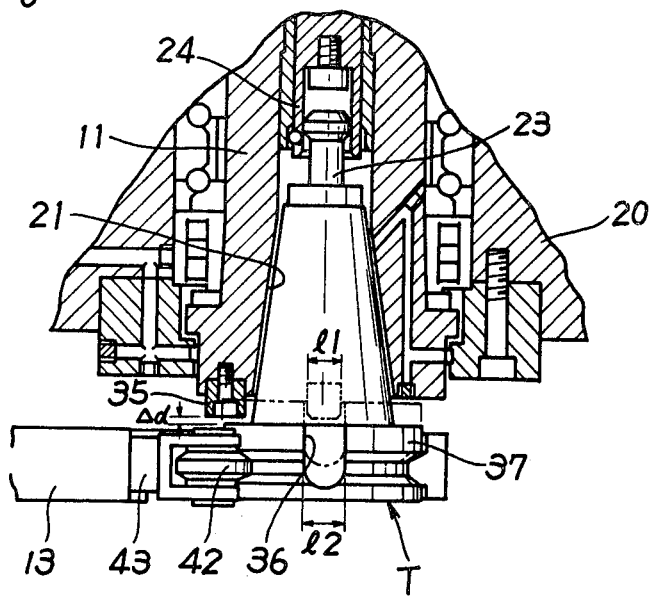
FIG. 8 shows the dimensional relation of the engagement between a key of a tool spindle and a key-way of a tool.

To the rear end of the spindle 11 are secured first and second dog members 33a, 33b at predetermined angular positions, referred to later in detail. The first and second dog members 33a, 33b cooperate with first and second proximity switches 34a, 34b secured to the housing 20 to generate first and second signals indicating the proper timing when a tool T should be inserted into and removed from the spindle 11, respectively. On the front end of the spindle 11 is mounted a key 35 which is engageable with each one of the key-ways 36 formed on a flange portion 37 of a tool T. In order to make engagement between the key 35 and the key-way 36 without trouble during rotation of the spindle 11, the width l1 of the key 35 is formed to be more narrow than the width l2 of the key-way 36 by several millimeters, as shown in FIG. 8.

Figure 3:
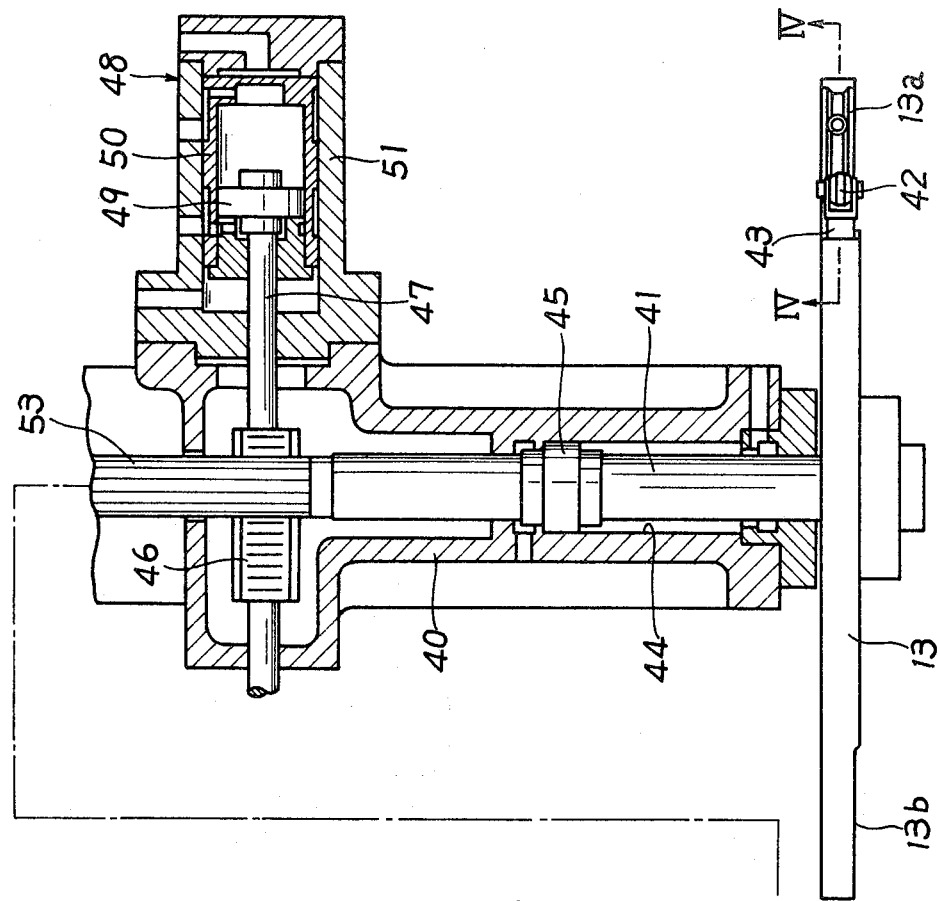
FIG. 3 is an enlarged sectional view taken along the lines III—III in FIG. 1.
Figure 3:
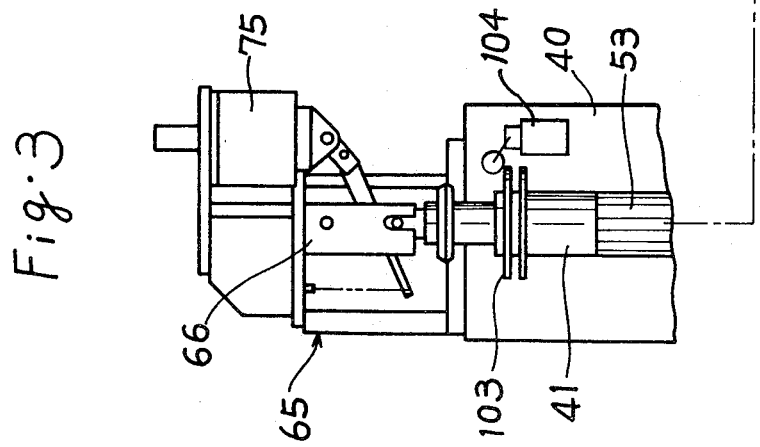

Referring to FIG. 3, showing a detailed construction of the tool change arm 13 and a drive device therefor, a support shaft 41 is rotatably and axially movably supported by a support body 40. The support shaft 41 has secured at its lower end the tool change arm 13 which is formed at its opposite ends with a pair of circular tool grippers 13a and 13b symmetric with respect to the axis of the support shaft 41 and engageable with the flange portion 37 of each tool T. In order to prevent a tool T from falling from the tool gripper 13a or 13b, a plunger 43, rotatably supporting an engaging roller 42 at its one end, is guided at each end of the tool change arm 13 to be movable in a substantially radial direction and is urged outwardly by a spring, not shown. This spring is calibrated in such a manner that when the tool change arm 13 is rotated to grip or release the tools held in the spindle 11 and the tool socket 16 in its vertical position, the plunger 43 is moved inwardly to allow such grip or release of the tool, and when the tools are held by the tool grippers 13a and 13b of the tool change arm 13, the engaging roller 42 is urged toward the tool T to prevent the tool from falling but to allow frictional rotation of the tool.

The support shaft 41 is formed at its intermediate portion with a piston 45 slidably received in a cylinder 44 formed in the support body 40. Selective supply of pressurized fluid into upper and lower cylinder chambers of the cylinder 44 causes the tool change arm 13 to be vertically moved to insert and withdraw the tools T. The support shaft 41 is formed at its upper end with an elongated gear 53 being in meshing engagement with a rack bar 46. The rack bar 46 is connected through a piston rod 47 with a piston 49 of a hydraulic cylinder 48 capable of positioning at four positions. The piston 49 is slidably received in an inner cylinder 50 which is, in turn, slidably received in an outer cylinder 51. When the inner cylinder 50 is moved relative to the outer cylinder 51 with relative movement being restrained between the piston 49 and the inner cylinder 50, the tool change arm 13 is rotated between a ready position shown in solid lines in FIG. 1 and a tool grip position shown in phantom lines to grasp or release the tools. When the piston 49 is moved relative to the inner cylinder 50 which is restrained from movement relative to the outer cylinder 51 at its right or left end position, the tool change arm 13 is rotated 180 degrees to change the tools.

Figure 4:
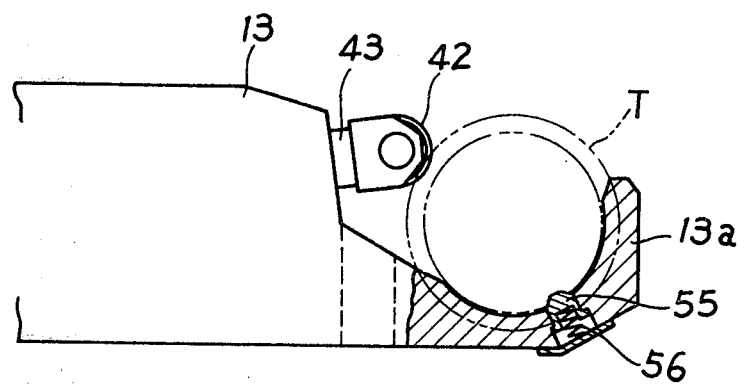
FIG. 4 is an enlarged sectional view taken along the lines IV—IV in FIG. 3.

Referring now to FIG. 4, a detent pin 55, engageable with the key-way 36 of the tool T, is slidably received in each of the tool grippers 13a, 13b and urged by a spring 56 in the radial direction of the tool T for restricting the rotational movement of the tool T. However, the detent pin 55 is chamfered at the edges so as to allow the rotation of the tool T when the tool T is forced to rotate by the spindle 11 through the key engagement between the key 35 and the key-way 36.

Figure 5:
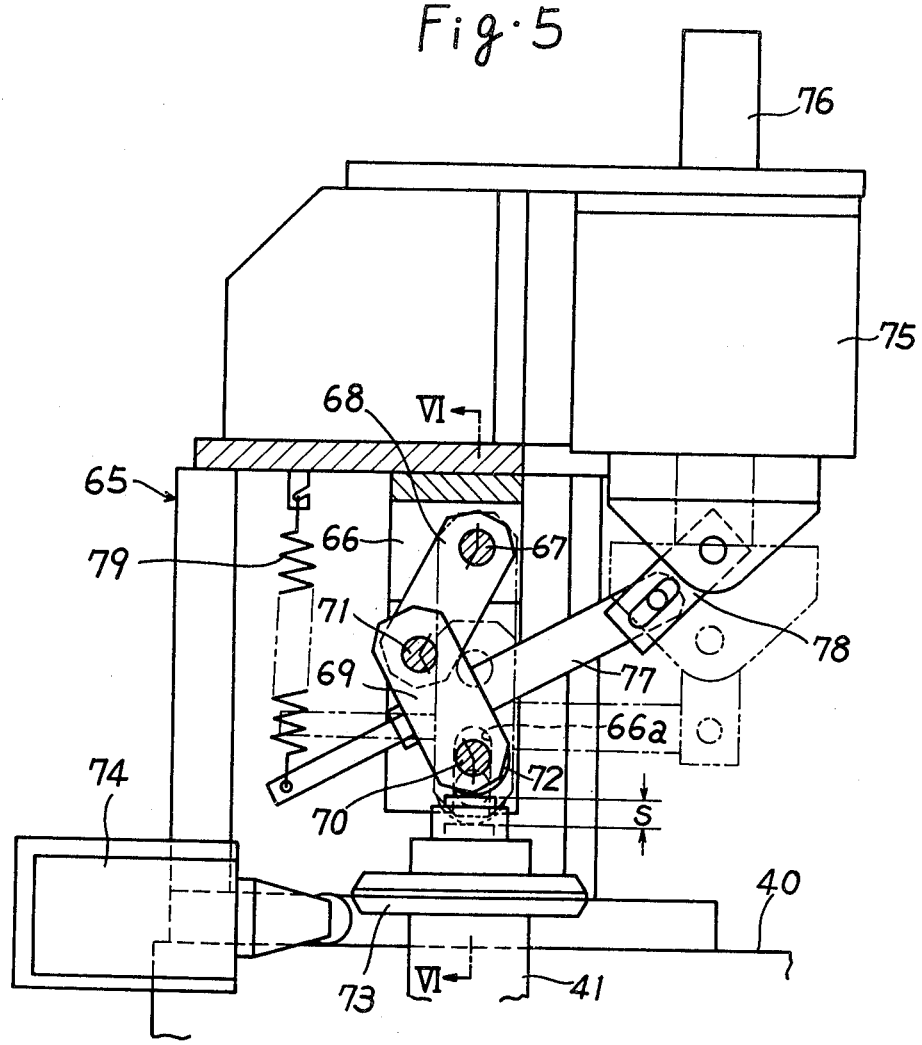
FIG. 5 is an enlarged view, partly in section, of a stopping device shown in FIG. 3.
Figure 6:
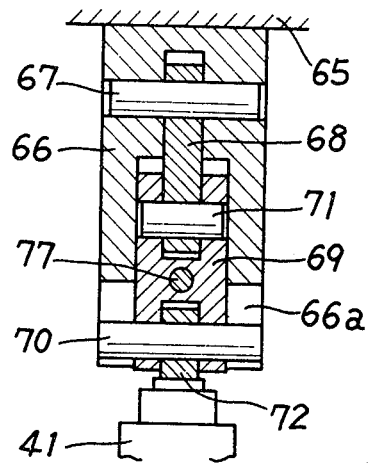
FIG. 6 is a sectional view taken along the lines VI—VI in FIG. 5.

Description is now made to a stopping device, shown in FIGS. 3, 5 and 6, for stopping the axial movement of the tool change arm 13 at a predetermined intermediate position immediately before the flange portion 37 of the tool T comes into contact with the key 35. To the upper portion of the support body 40 is secured a support bracket 65, as shown in FIGS. 5 and 6 in detail, in which a link holder 66 is secured above the support shaft 41. The link holder 66 is provided with a fixed pin 67 horizontally secured thereto at the upper portion thereof and a vertically elongated groove 66a formed at the lower portion thereof. The fixed pin 67 rotatably supports one end portion of a first link 68. A movable pin 70 horizontally secured to one end portion of a second link 69 is received slidably in the axial direction of the support shaft 41 in the elongated groove 66a. A connecting pin 71 rotatably supports the other end portions of the links 68, 69 so that the distance between the fixed pin 67 and the movable pin 70 may be varied. A roller 72, engageable with the top end of the support shaft 41, is rotatably supported at the intermediate portion of the movable pin 70.

Accordingly, when the first and second links 68, 69 are in a bent position, as shown in solid lines in FIG. 5, the support shaft 41 may be moved upward toward the uppermost position where the piston 45 comes into contact with the upper end wall of the cylinder 44, however, when they are in the straight position, as shown in phantom lines in FIG. 5, the support shaft 41 is prevented from moving upward further from the intermediate position which is lower than the uppermost position by a predetermined distance S due to the engagement of the roller 72 with the top end of the support shaft 41. The intermediate position is adjusted in such a way that the flange portion 37 of the tool T gripped in the tool change arm 13 is apart a predetermined distance $\Delta d$ from the key 35 of the tool spindle 11, as shown in FIG. 8. A limit switch 74 is mounted on the support bracket 65 and actuated in cooperation with a dog member 73 secured to the support shaft 41 in order to confirm that the support shaft 41 is stopped at the intermediate position. Further secured to the support bracket 65 is a solenoid 75 having an actuating rod 76, one end of which is connected through a connecting link 78 with one end of a link 77 which is secured to the second link 69. The other end of the link 77 is pulled upward by a tension spring 79 attached to the support bracket 65 so as to tend to straighten the first and second links 68, 69. However, when the solenoid 75 is actuated to hold the actuating rod 76 at the upper position shown in solid lines in FIG. 5, the first and second links 68, 69 are maintained in the bent position against the force of the tension spring 79. Therefore, the solenoid 75 constitutes a releasing device for releasing the abovementioned stopping operation of the stopping device.

Figure 7:
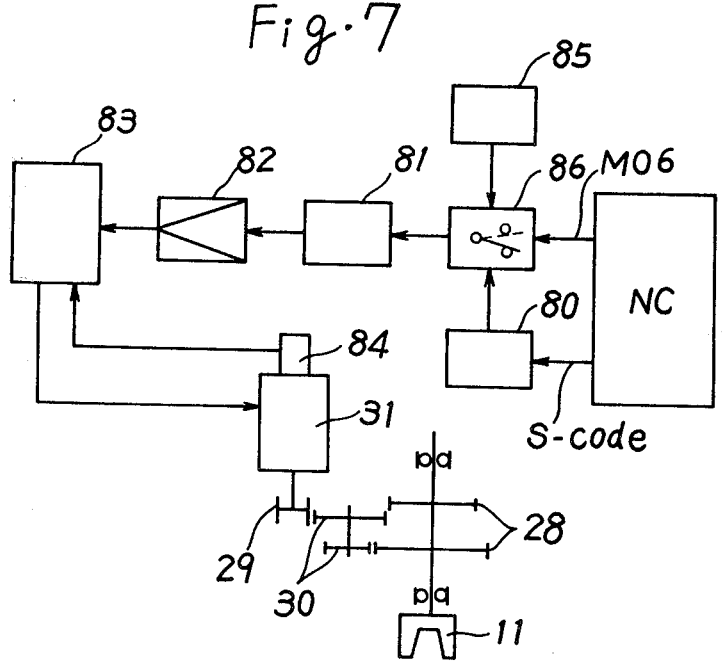
FIG. 7 is a block diagram showing an electric control circuit for controlling a spindle drive motor.

Referring now to FIG. 7, the spindle drive motor 31 is controlled to be rotated at a speed depending upon any of the various tools inserted in the spindle 11. When a rotational speed command (S-code) is applied from the numerical control device NC to a register 80, the speed command is converted by a digital to analog converter 81 into a corresponding voltage which is, in turn, applied as a speed command voltage to a motor drive circuit 83 through an amplifier 82. The actual rotational speed of the drive motor 31 is detected by a speed detector 84, and the detected actual speed is fed back to the motor drive circuit 83. Accordingly, the rotational speed of the drive motor 31 is controlled in such a manner that the detected actual rotational speed becomes equal to the commanded rotational speed. When a d.c. motor is used as the drive motor 31, a thyristor Leonard device is used as the motor drive circuit 83. When an a.c. motor is used as the drive motor 31, a variable frequency inverter device is used as the motor drive circuit 83.

In order to perform a tool change operation, it is necessary to reduce the rotational speed of the spindle 11 from a speed depending upon any of various tools to a predetermined low speed, such as several tens rpm. A setting device 85 of setting such predetermined low speed command is connected to the digital to analog converter 81 through a switching circuit 86. When the numerical control device NC generates a tool change command MO6, the switching circuit 86 applies, instead of a rotational speed command set in the register 80, the predetermined low speed command set in the setting device 85 to the digital to analog converter 81. As a result, the motor drive circuit 83 controls the rotation of the motor 31 so as to rotate the spindle 11 at the set low speed. When engagement between the key-way 36 of the tool T and the key 35 is confirmed by a limit switch 104 in cooperation with a dog member 103 secured to the support shaft 41, as shown in FIG. 3, the switching circuit 86 is changed over to cause the rotational speed command set in the register 80 to be applied to the digital to analog converter 81, whereby the spindle 11 is rotated at a speed depending upon a tool T inserted therein.

Figure 9:
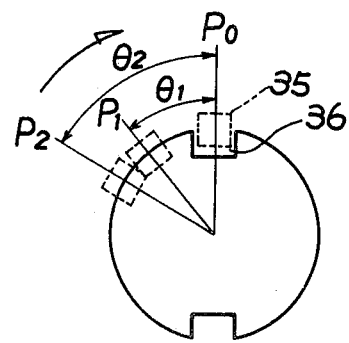
FIG. 9 shows the relation between angular positions P1 and P2 where signals are generated by the first and second detecting devices shown in FIG. 2, and a position P0 where the key of the tool spindle reaches the corresponding position of the key-way of the tool.

Referring now to FIG. 9, wherein the spindle 11 is rotated in a clockwise direction indicated by an arrow, angular positions P1, P2 indicate the timing when the first and second proximity switches 34a, 34b generate the first and second signals in cooperation with the first and second dog members 33a, 33b, respectively, and an angular position P0 indicates the timing when the key 35 of the spindle 11 reaches the corresponding position of the key-way 36 of a tool T. An angular distance $\theta 1$ between the angular positions P1 and P0 corresponds to the rotational angular range of the spindle 11 while the tool change arm 13 is axially moving the distance $\Delta d$ from the intermediate stop position in response to the first signal. Similarly, an angular distance $\theta 2$ between the angular positions P2 and P0 corresponds to the rotational angular range of the spindle 11 while the tool change arm is moving downwardly in response to the second signal until the key 35 and the key-way 36 are disengaged.

In this embodiment, since the distance $\Delta d$ is set rather small, the angular distance $\theta 2$ is larger than the angular distance $\theta 1$. It is noted, however, that the distances $\theta 1$, $\theta 2$ can be varied by changing the angular positions of the first and second dog members 33a, 33b.

The operation of the machine tool with an automatic tool change function according to the present invention will now be described. The spindle 11 is usually rotated within a wide range from 20 to 3,000 rpm, and the shiftable gear 30 is operated at the intermediate of such range to change the reduction gear ratio. For example, the shiftable gear 30 is shifted to a low speed range when the rotational speed is lower than 1,100 rpm, and to a high speed range when the rotational speed is higher than 1,100 rpm. Accordingly, frequency in use at the low speed range is higher in usual machining operations, so that the shiftable gear 30 is hereunder assumed to be shifted to the low speed rage for convenience of description.

Upon completion of a machining operation by a predetermined tool, the spindle 11 continues to rotate at a high speed depending upon the rotational speed command set in the register 80. The spindle head 10 is moved upward to its upper end position for a tool change operation. When the tool change command MO6 is generated from the numerical control device NC, the switching circuit 86 is changed over to apply a rotational speed command set in the setting device 85,. Accordingly, the drive motor 31 is applied with an electrical braking torque so as to rotate the spindle 11 at a predetermined low speed suitable for key engagement. Thereafter, the tool change arm 13 is rotated to grip, by the tool grippers 13a and 13b thereof, the tools T held in the vertically oriented tool socket 16 and the spindle 11. The unclamping cylinder 24 is subsequently operated to move the drawing rod 22 downwardly against the springs 23, thereby unclamping the tool T held in the spindle 11. When the spindle 11 is rotated to the predetermined position P2, where the second proximity switch 34b is changed from OFF to ON state, pressurized fluid is supplied to the upper chamber of the cylinder 44 to move the tool change arm 13 downwardly, thereby withdrawing the tools T from the spindle 11 and the tool socket 16. The key-way 36 of the tool T is disengaged from the key 35 of the spindle 11 by such withdrawal of the tool T from the spindle 11, whereby rotation of the tool T withdrawn from the spindle 11 is immediately stopped by the grip force of the tool change arm 13. Accordingly, the key-way 36 of the tool T grasped by the tool change arm 13 is maintained at a substantially predetermined angular position, which corresponds to the position of the key-way 36 of each tool T held in the tool socket 16 of the tool magazine 15.

After the tool change arm 13 is moved to its lower end position, the piston 49 is moved, with movement of the inner cylinder 50 being restrained, to rotate the tool change arm 13 by 180 degrees. During the withdrawing movement of the tool change arm 13 and the rotation of the tool change arm 13, the solenoid 75 is caused to be demagnetized to lower the actuating rod 76. As a result, the first and second links 68, 69 are straightened by the force of the spring 79, as shown in phantom lines in FIG. 5, and the roller 72 is caused to extend downwardly by the predetermined length S. After the tool change arm 13 is rotated by 180 degrees, pressurized fluid is supplied to the lower chamber of the cylinder 44 to move the tool change arm 13 upwardly to insert the tool T withdrawn from the tool socket 16 into the tapered bore 11a of the spindle 11 and the tool withdrawn from the spindle 11 into the tool socket 16. However, since the roller 72 is in the extended position, the upward movement of the tool change arm 13 is stopped at the intermediate position immediately before the flange portion 37 of the tool T comes into contact with the key 35 of the tool spindle 11 rotating at the predetermined low speed due to the engagement of the top portion of the support shaft 41 with the roller 72. This intermediate stop of the tool change arm 13 is detected by the actuation of the limit switch 74 with the dog member 73 secured to the support shaft 41. Subsequently, when the first proximity switch 34a detects that the key 35 of the rotating tool spindle 11 comes into the predetermined position P1 relative to the key-way 36 of the tool T grasped by the tool change arm 13 with its angular position maintained by the detent pin 55, the solenoid 75 is actuated to move the actuating rod 76 upward, whereby the first and second links 68, 69 are bent against the force of the spring 79 so as to move the roller 72 upward and permit the support shaft 41 to move from the intermediate position. Accordingly, the tool change arm 13 is again moved upward by pressurized fluid applied to the cylinder 44, thereby to make engagement of the key-way 36 of the tool T with the key 35 of the tool spindle 11. The rotation of the spindle 11 is transmitted through the key 35 to the tool T to forcibly rotate the same gripped by the tool gripper 13a of the tool change arm 13.

Simultaneously with this, the tool T which is previously inserted into the spindle 11 and now gripped by the other tool gripper 13b is returned to the tool socket 16 in such a manner that the key-way 36 of the tool T is engaged with the detent pin 16a of the tool socket 16 to avoid its rotation.

Accordingly, a large diameter tool with a radially projected cutter is prevented from interference with an adjacent tool on the tool magazine 15. Further, a predetermined one of the two key-ways 36 is always engaged with the key 35 of the spindle, whereby the position of the tool T relative to the spindle 11 is maintained even after several tool change operations to thereby achieve a precision machining operation.

After the tool change arm 13 is moved to its upward end position, and the tools T gripped by the tool grippers 13a, 13b are inserted into the spindle 11 and the tool socket 16, the key engagement between the key 35 and the key-way 36 is confirmed by the actuation of the limit switch 104 with the dog member 103 secured to the support shaft 41. The confirmation of key engagement causes the unclamping cylinder 24 to be deactivated to thereby release the urging force of the drawing rod 22. Accordingly, the tool T is clamped on the spindle 11 by means of the springs 23. Subsequently, the tool change arm 13 is rotated back to its ready position, thereby completing a tool change operation. With the tool change operation being completed, the tool change command is cancelled so that the switching circuit 86 renders a command signal from the setting device 85 inoperative and a command signal from the register 80 operative. The spindle 11 is thus rotated at a high speed depending upon a newly inserted tool for the next machining operation.

In the above-described embodiment, the tool change arm 13 is used as a tool support device. However, the present invention can be applied to a machine tool wherein tools are directly changed between the tool magazine and the spindle. In such a case, the tool magazine is used as the tool support device.

Further, a stopping device is provided with a link mechanism for stopping the support shaft 41 and the tool change arm 13 at the intermediate position, and with a solenoid 75 for releasing its stopping operation. However, the present invention is not limited to this embodiment and other devices may be used.

Furthermore, in the above-described embodiment, two sets of a dog member and a proximity switch are provided for generating two signals for a tool change operation, however, only one set of a dog member and a proximity switch is necessary if the distance $\Delta d$ is adjusted to correspond to the length of the key engagement between the key 35 and the key-way 36 so as to equalize the angular distance $\theta 1$ to the angular distance $\theta 2$. In this case, a signal generated from the set of the dog member and the proximity switch is used to indicate proper timing for both insertion and withdrawal of a tool.

As described above, according to the present invention, a tool change operation is carried out while the spindle is rotated. Therefore, there is no need to provide a device to stop the spindle at a predetermined angular position, as in the conventional apparatus, whereby the tool change time is considerably shortened, resulting in an increase in the machining efficiency.

Further, according to the present invention, a key of a spindle is engaged with a key-away of a tool without sliding contact therebetween, whereby the tool and the key are prevented from being worn or scratched.

Furthermore, according to the present invention, a tool is removed from the rotating spindle in response to a signal confirming the predetermined angular position of the spindle, whereby the key-way of a tool returned from the spindle to the tool magazine is maintained at a substantially predetermined angular position. This arrangement and control is particularly effective for large sized tools.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a machine tool with an automatic tool change function having a tool spindle rotatably supported and capable of receiving a tool at one end thereof, the improvement comprising:
   a key fixedly mounted on one end of said tool spindle;
   a key-way formed on said tool;
   tool support means for rotatably supporting at least one tool to selectively insert and remove said at least one tool into and from said tool spindle;
   control means responsive to a tool change command for rotating said tool spindle at a predetermined speed suitable for the engagement of said key with said key-way;
   operating means for causing relative movement between said tool support means and said tool spindle in an axial direction of said tool spindle for a tool change operation with said tool spindle being rotated at the predetermined speed;
   stopping means for stopping said relative movement between said tool support means and said tool spindle at a predetermined position in the axial direction of said tool spindle before said key comes into engagement with said key-way;
   first detecting means for detecting a first predetermined angular position of said key relative to said key-way to thereby generate a first signal; and
   releasing means responsive to said first signal for permitting said relative movement between said tool support means and said tool spindle.

2. A machine tool as claimed in claim 1, further comprising:
   second detecting means for detecting the engagement of said key with said key-way to generate a second signal; and
   clamp means responsive to said second signal for clamping said tool inserted into said tool spindle.

3. A machine tool as claimed in claim 2, further comprising third detecting means for detecting a predetermined angular position of said key relative to said key-way to thereby generate a third signal, and wherein said operating means is operated in response to said third signal for causing relative movement between said tool support means and said tool spindle to remove said tool from said tool spindle.

4. A machine tool as claimed in claim 3, wherein said first detecting means comprises a first dog member secured to said tool spindle and a first proximity switch.

5. A machine tool as claimed in claim 3, wherein said second detecting means comprises a dog member secured to said tool support means and a limit switch.

6. A machine tool as claimed in claim 3, wherein said third detecting means comprises a dog member secured to said tool spindle and a proximity switch.

7. A machine tool as claimed in claim 3, wherein said tool support means comprises:
   a tool change arm rotatable and movable in a direction parallel to the axis of said tool spindle; and
   a tool gripper provided on said tool change arm and capable of rotatably supporting said tool.

8. A machine tool as claimed in claim 7, wherein said tool support means further comprises:
   a tool magazine supporting a plurality of tool sockets;
   said tool sockets each being capable of removably supporting one of said tools; and
   a detent member mounted on each of said tool sockets for restricting the rotational movement of said one of said tools supported therein.

9. In a machine tool with an automatic tool change function having a tool spindle rotatably supported and capable of receiving a tool at one end thereof, the improvement comprising:
   a key fixedly mounted on one end of said tool spindle;
   a key-way formed on said tool;
   tool support means for rotatably supporting at least one tool to selectively insert and remove said at least one tool into and from said tool spindle;
   control means responsive to a tool change command for rotating said tool spindle at a predetermined speed suitable for the engagement of said key with said key-way;
   operating means for causing relative movement between said tool support means and said tool spindle in an axial direction of said tool spindle for a tool change operation with said tool spindle being rotated at the predetermined speed;
   stopping means operable against said operating means for stopping said relative movement between said tool support means and said tool spindle at a predetermined position in the axial direction of said tool spindle before said key comes into engagement with said key-way, said operating means being urged to further cause said relative movement while said stopping means is in operation;
   first detecting means for detecting a first predetermined angular position of said key relative to said key-way to thereby generate a first signal; and
   releasing means responsive to said first signal for deactivating said stopping means so as to thereby permit said operating means to further cause said relative movement between said tool support means and said tool spindle.

10. A machine tool as claimed in claim 9, wherein said tool support means includes:
   tool storage means for removably storing a plurality of tools with key-ways thereof being maintained at a predetermined angular position;

a shaft rotatable and axially movable in a direction parallel to the axis of said tool spindle; and a tool change arm secured to one end of said shaft and capable of rotatably supporting said tools at least one at a time;

said operating means being connected to said shaft and operable to rotate and axially move said shaft for a tool change operation between said tool storage means and said tool spindle.

11. A machine tool as claimed in claim 10, wherein said stopping means includes:

a first link pivotable at one end thereof about a fixed pin;

a second link pivotably connected at one end thereof to the other end of said first link and guided at the other end thereof by a guide slot extending on the axis of said shaft, the other end of said second link being engageable with the other end of said shaft; and a spring for urging said first and second links to make a line substantially on an extension of the axis of said shaft.

12. A machine tool as claimed in claim 11, wherein said releasing means includes:

a solenoid-operated actuator responsive to said first signal for bending said first and second links against the force of said spring.

13. A machine tool as claimed in claim 12, wherein said first detecting means includes:

a dog secured to said tool spindle; and a proximity switch actuatable by said dog for generating said first signal when the rotation of said tool spindle brings said key into said first predetermined angular position relative to said key-way of said tool being supported by said tool change arm.

* * * * *

UNITED STATES PATENT AND TRADEMARK OFFICE
CERTIFICATE OF CORRECTION

PATENT NO. : 4,414,732

DATED : November 15, 1983

INVENTOR(S) : Tomita et al

It is certified that error appears in the above-identified patent and that said Letters Patent is hereby corrected as shown below:

On the title page add:
--[30] Foreign Application Priority Data

December 5, 1980  Japan..... 55-172248 --.

Signed and Sealed this

Seventeenth Day of January 1984

[SEAL]

Attest:

GERALD J. MOSSINGHOFF

*Attesting Officer*      *Commissioner of Patents and Trademarks*